Patented Dec. 11, 1951

2,577,947

UNITED STATES PATENT OFFICE 2,577,947

MANUFACTURE OF DIHYDROCODEINONE

Manuel M. Baizer, Flushing, N. Y., and Richard P. Williams, Englewood, N. J., assignors to New York Quinine and Chemical Works, Incorporated, Brooklyn, N. Y., a corporation of New York No Drawing. Application October 5, 1950,
Serial No. 188,646

4 Claims. (Cl. 260—285)

In co-pending application Serial Number 85,729, filed by one of us, M. M. Baizer, on April 5, 1949, now Patent No. 2,544,291 issued March 6, 1951, it is stated that it is desirable to use codeine as supplementary source for the production of dihydrocodeinone (hereinafter conveniently referred to as DHC) and its bitartrate because thebaine from which these substances are usually obtained occurs in opium in amounts of only 0.1 to 1% whereas codeine is present therein to the extent of 3% (Henry, The Alkaloids, 1949, pages 216 and 219) and further can readily be made from morphine. The problems of freeing this substance from codeine and otherwise operating the manufacturing process seems not to have been solved as yet.

In said co-pending application is described an improved method for the manufacture of codeine-free dihydrocodeinone and its bitartrate from codeine which comprises heating the crude base in dilute acid such as sulfuric acid solution in the presence of supported palladium catalyst, cooling the filtered reaction mixture, making it alkaline and extracting the crude DHC from it with an organic solvent such as benzene, then extracting it from the solvent solution with sodium bisulfite solution, making the extract alkaline, filtering off the precipitated crude DHC washing and drying it, dissolving it in a halogenated aliphatic hydrocarbon such as ethylene chloride, fractionating the solution by passing it over aluminum oxide whereby an effluent containing codeine-free dihydrocodeinone is obtained, adding tartaric acid dissolved in an aqueous alcohol to the effluent, and filtering, washing and drying the precipitated bitartrate of dihydrocodeinone.

This bitartrate when tested with ferric chloride T. S. in sulfuric acid solution (New and Non-Official Remedies 1950, pages 41 and 562) gave no color change at all, and is therefore substantially free from codeine and acceptable for medical use.

When in this earlier described process the solution of the crude DHC in an organic solvent is extracted with sodium bisulfite solution, the latter functions merely as a weak acid and brings into solution all the alkaloids present in the crude dihydrocodeinone. They are precipitated along with the DHC by the subsequent precipitation step in alkaline medium. The crude DHC thus obtained is then purified by chromatographing it thru alumina in order to obtain a bitartrate which meets the NNR specifications.

We have now discovered that this process can be further simplified and considerably shortened if the solution of the crude DHC in the organic solvent is treated with a saturated aqueous solution of Na-bisulfite. We have found that this treatment causes the DHC to be almost quantitatively precipitated from the organic solvent presumably as an addition compound with the Na-bisulfite. This addition compound after one recrystallization from water using charcoal to remove color is substantially pure and can be converted by alkali to DHC alkaloid which directly yields the bitartrate meeting the NNR specifications.

Furthermore, treatment of the aqueous DHC—Na bisulfite recrystallization liquor with alkali and extraction with benzene yields an organic solution which can be recycled thru the isolation and purification steps. We have found that in a consecutive series of runs involving such recycling there is no evidence that the DHC-bitartrate produced suffers any deterioration in quality as the series progresses. This indicates that the original DHC-Na bisulfite compound is substantially free of other alkaloids, and that the aqueous recrystallization step primarily effects color improvement rather than separation of alkaloids other than DHC.

This improvement of the earlier process eliminates the need for separately removing the interfering alkaloids contained in the crude DHC. Considering the low solubility of the water-immiscible solvents in the concentrated salt solutions, it was surprising that even vigorous contact between the two immiscible layers would permit almost quantitative interaction between DHC and Na-bisulfite, and furthermore that the precipitated addition compound was almost completely free from impurities thus eliminating the need for further substantial purification.

The following example describes our invention:

One hundred and fifty parts of codeine alkaloid (anhydrous bases) is dissolved in a solution of 47 parts concentrated sulfuric acid in 930 parts of water. Sixty-three parts of 5% palladium in charcoal is added and the mixture heated under reflux for about an hour. It is then filtered hot; the catalyst mass is washed with dilute sulfuric acid.

The cooled aqueous solution is made strongly alkaline with sodium hydroxide and thoroughly extracted with benzene. The combined benzene extracts are washed and stirred for several hours with a freshly prepared solution containing about 190 parts sodium bisulfite in 355 parts of water. The mixture is filtered and the filter-cake washed and air-dried.

The filter cake is dissolved in the minimum quantity of hot water and treated with decolorizing carbon for 0.5 hr. It is filtered hot, the filtrate is chilled for 24 hours and filtered. The recrystallized bisulfite addition compound is converted to alkaloid by stirring with aqueous ammonia or sodium hydroxide. The precipitated alkaloid is filtered and washed free of excess alkali.

The mother liquor obtained in the recrystallization of the crude bisulfite compound is made alkaline and extracted with benzene. The benzene extracts are treated in the same way as are those described above.

In a series of ten successive runs, with re-use of the alkaloid recovered from the bisulfite liquor, as described above, the average yield of dihydrocodeinone was 60 parts.

The bitartrate is made from this alkaloid for example by adding an aqueous solution of tartaric acid to an acetone solution of DHC, filtering the precipitated DHC-bitartrate and drying it to the proper moisture content of about 9%. This compound was found to meet the N. N. R. requirements in all respects.

Instead of using codeine alkaloid in this process, we can also employ codeine sulfate and adjust the acidity of the rearrangement solution to that shown in the example.

The solvent employed for the extraction of the crude DHC from the rearrangement solution can be any water-soluble, non-ketonic organic solvent such as benzene used in the present example, or xylene, toluene, water-immiscible alcohols such as cyclohexanol and the like.

What we claim is:

1. In an improved method for the manufacture of codeine-free dihydrocodeinone from codeine which comprises heating the crude base in dilute acid solution in the presence of supported palladium catalyst, cooling the filtered reaction mixture, making it alkaline and extracting the crude dihydrocodeinone from it with an organic solvent the steps which comprise stirring the organic solvent solution with a saturated aqueous solution of sodiumbisulfite, separating the resulting precipitate of dihydrocodeinone-Na bisulfite and Na-bisulfite, recrystallizing it from water in the presence of decolorizing carbon, decomposing it with aqueous alkali, separating the resulting free dihydrocodeinone, washing and drying it.

2. In an improved method for the manufacture of codeine-free dihydrocodeinone from codeine which comprises refluxing 150 parts of codeine alkaloid (anhydrous basis) and 63 parts of 5% palladium on charcoal in a solution of 47 parts of concentrated sulfuric acid in 980 parts of water filtering the hot reaction mixture, cooling the filtrate to room temperature, making it strongly alkaline and extracting it with benzene, and washing the combined benzene extracts with water the steps which comprise stirring the benzene extracts with a freshly prepared solution of about 190 parts of sodium bisulfite in 355 parts of water, filtering the resulting precipitate of dihydrocodeinone-Na bisulfite and Na-bisulfite, washing the filter cake with water, drying it, recrystallizing it from hot water in the presence of decolorizing carbon, slurrying the damp recrystallized bisulfite addition compound with water, stirring the slurry with ammonia, filtering the resulting free alkaloid, washing and drying it.

3. In the method of claim 1 the steps which comprise making alkaline the mother liquor obtained by recrystallization of the crude sodium bisulfite dihydrocodeinone compound from water, extracting it with the organic solvent used in extracting the crude dihydrocodeinone, and using the extract in lieu of a portion of fresh organic solvent employed by extracting the crude dihydrocodeinone.

4. In the method of claim 2 the steps which comprise making alkaline the mother liquor obtained in the recrystallization of the crude sodium bisulfite compound from water, extracting it with benzene, and using the extract in lieu of a portion of the fresh benzene employed for the initial extraction.

MANUEL M. BAIZER.
RICHARD P. WILLIAMS.

REFERENCES CITED

The following references are of record in the file of this patent:

UNITED STATES PATENTS

| Number | Name | Date |
|---|---|---|
| 2,544,291 | Baizer | Mar. 6, 1951 |